March 30, 1937.  A. BARÉNYI  2,075,081
FOLDING CAMERA
Filed May 17, 1935
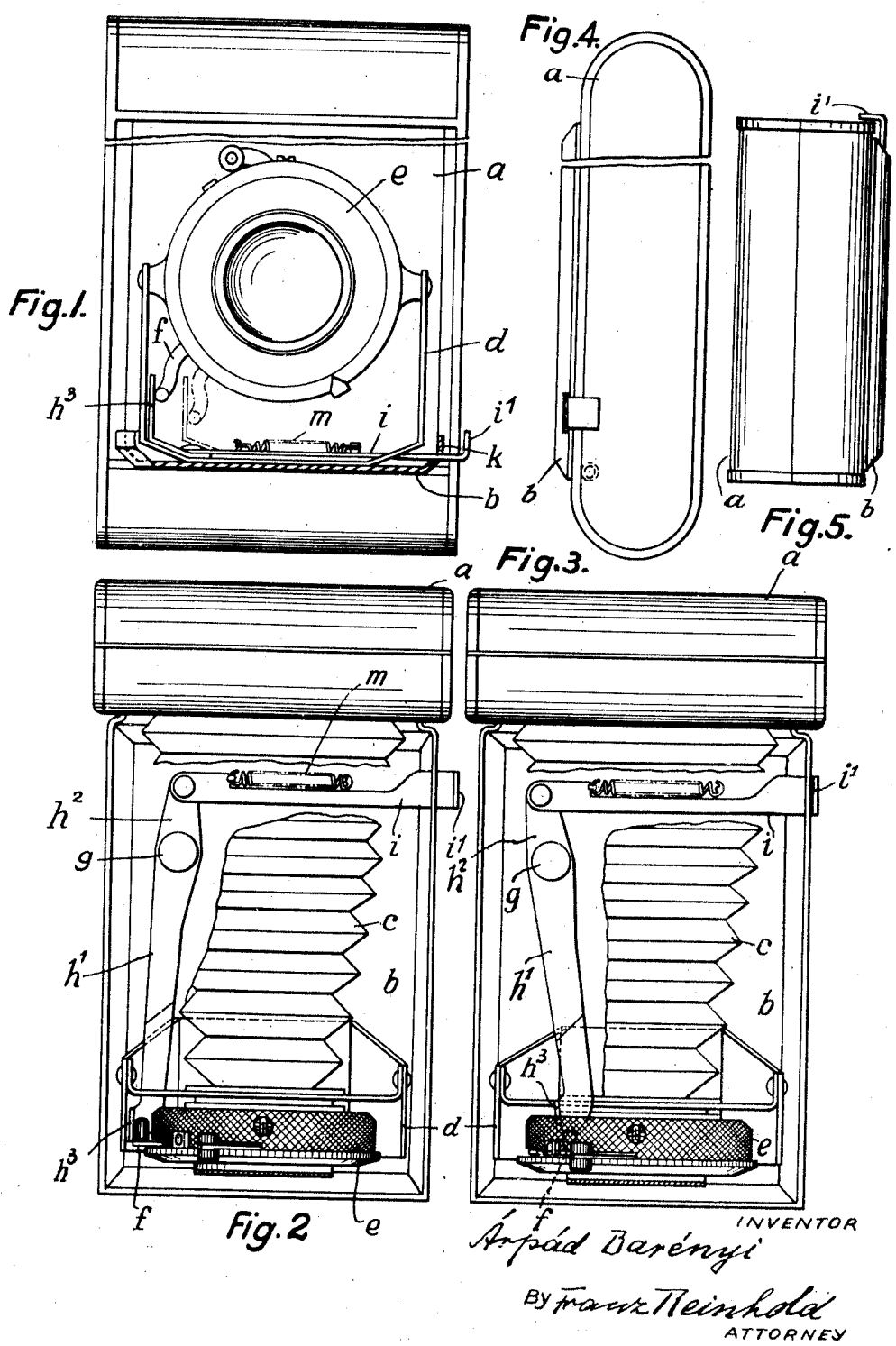

Patented Mar. 30, 1937

2,075,081

UNITED STATES PATENT OFFICE 2,075,081

FOLDING CAMERA

Árpád Barényi, Berlin-Lichterfelde, Germany, assignor to Voigtländer & Sohn Aktiengesellschaft, Brunswick, Germany, a joint-stock company of Germany Application May 17, 1935, Serial No. 22,048
In Germany July 14, 1934

5 Claims. (Cl. 95—53)

My invention relates to improvements in folding cameras, and more particularly in the construction of the shutter release. The object of the improvements is to provide a shutter release which may be operated while the camera is steadily held by both hands of the photographer, and which is simple in construction, and with this object in view my invention consists in providing release mechanism mounted on the base board and having an operating device located when the base board is open near the camera casing, so that it may be engaged by the finger of the photographer holding the camera casing with both hands. Other objects of the improvements will appear from the following description.

For the purpose of explaining the invention an example embodying the same has been shown in the accompanying drawing in which the same reference characters have been used in all the views to indicate corresponding parts. In said drawing, Fig. 1 is an elevation of the camera with the base board extended and partly in section, Fig. 2 is a plan view with the bellows partly broken away, and with the release mechanism out of engagement with the release lever of the shutter, Fig. 3 is a similar plan view showing the release mechanism in position after releasing the shutter, Fig. 4 is a fragmentary elevation showing the camera closed, and Fig. 5 is a plan view of Fig. 4 showing the camera closed.

In the example shown in the drawing the camera comprises a casing $a$, a base board $b$ hinged thereto, bellows $c$, a lens support $d$ and a shutter $e$. The shutter operating mechanism is adapted to be released by means of a release lever $f$, the said release lever being mounted so as to be shifted from the position shown in Fig. 1 in full lines into the position shown in broken lines for releasing the shutter mechanism.

On a pivot bolt $g$ fixed to the base board a lever is mounted which comprises a forwardly directed long arm $h^1$ and a rearwardly directed arm $h^2$. The forwardly directed arm is bent upwardly at its front end $h^3$ and into position for engagement with the release lever $f$, and the rearwardly directed arm $h^2$ is jointed to a rail $i$ which is guided in a slot $k$ made in the base board, and which has its outer end $i^1$ bent upwardly. The rail $i$ is acted upon by a spring $m$ which is attached thereto at one end and to the base board at the opposite end, the said spring tending to shift the rail $i$ to the right and to rock the lever $h^1$, $h^2$ with its upwardly directed part away from the release lever $f$. The rail $i$ and the upwardly directed portion $i^1$ thereof are located close to the camera casing $a$, so that for releasing the shutter the photographer may engage the portion $i^1$ with the finger while steadily holding the camera with both hands.

When the base board is projected and the lens holder is moved outwardly on the base board, the release lever $f$ is located in position for loose engagement with the portion $h^3$ of the release mechanism. If the photographer desires to take a photograph he holds the camera with both hands and one of the fingers of the left hand bears on the upwardly directed portion $i^1$ of the rail $i$. After the camera has been brought into the correct position by means of the finder the photographer presses the rail $i$ inwardly for operating the shutter, and since the camera is held with both hands it is steady in position so that shifting of the image of the film by operation of the release mechanism is impossible.

In the construction shown in the figures the auxiliary release comprises a lever $h^1$, $h^2$, and in order to permit the lens support to be shifted inwardly, the said lever $h^1$, $h^2$ is disconnected from the said lens support, and it is in loose engagement with the release lever $f$.

After the lens support has been pushed into the camera casing and the base board has been turned upwardly for closing the camera, all the parts are located within the casing $a$, and the outer end $i^1$ of the rail $i$ bears on the outside of the side wall of the camera thus locking the release mechanism in position, as is shown in Figs. 4 and 5.

I claim:
1. In a photographic camera a shutter release comprising a release lever cooperating with the shutter mechanism, operating mechanism for said release lever mounted on the base board and having a member on said base board located, when the camera is open, close to the camera casing.

2. A shutter release as claimed in claim 1 comprising means operative when the camera is closed for locking the release mechanism in position.

3. A shutter release as claimed in claim 1, in which the release mechanism comprises a lever rockingly mounted on the base board and having a portion in position for loose engagement with the release lever, and a rail jointed to said lever and extending transversely of the base board and near the camera casing, said rail projecting from the base board outwardly and into position for engagement by the finger of the photographer.

4. A shutter release as claimed in claim 1, in which the release mechanism comprises a lever rockingly mounted on the base board and having a portion in position for loose engagement with the release lever, and a rail jointed to said lever and extending transversely of the base board and near the camera casing, said rail projecting from the base board outwardly and into position for engagement by the finger of the photographer, said rail being formed with an upturned portion adapted when the camera is closed to bear on the side wall of the camera casing for locking the release mechanism in position.

5. In a photographic camera, a casing, a base board hinged thereto, a lens support shiftable on said base board, a shutter and its release on said lens support, operating means for said shutter release all mounted on said base board and having a member on said base board located, when the camera is open, close to the camera casing, said operating means being disconnected from said lens support and being adapted for loose engagement with said shutter release.

ÁRPÁD BARÉNYI.